Feb. 14, 1939.  W. A. OATES  2,147,365
LIQUID GAUGE
Filed Dec. 7, 1936  2 Sheets-Sheet 1
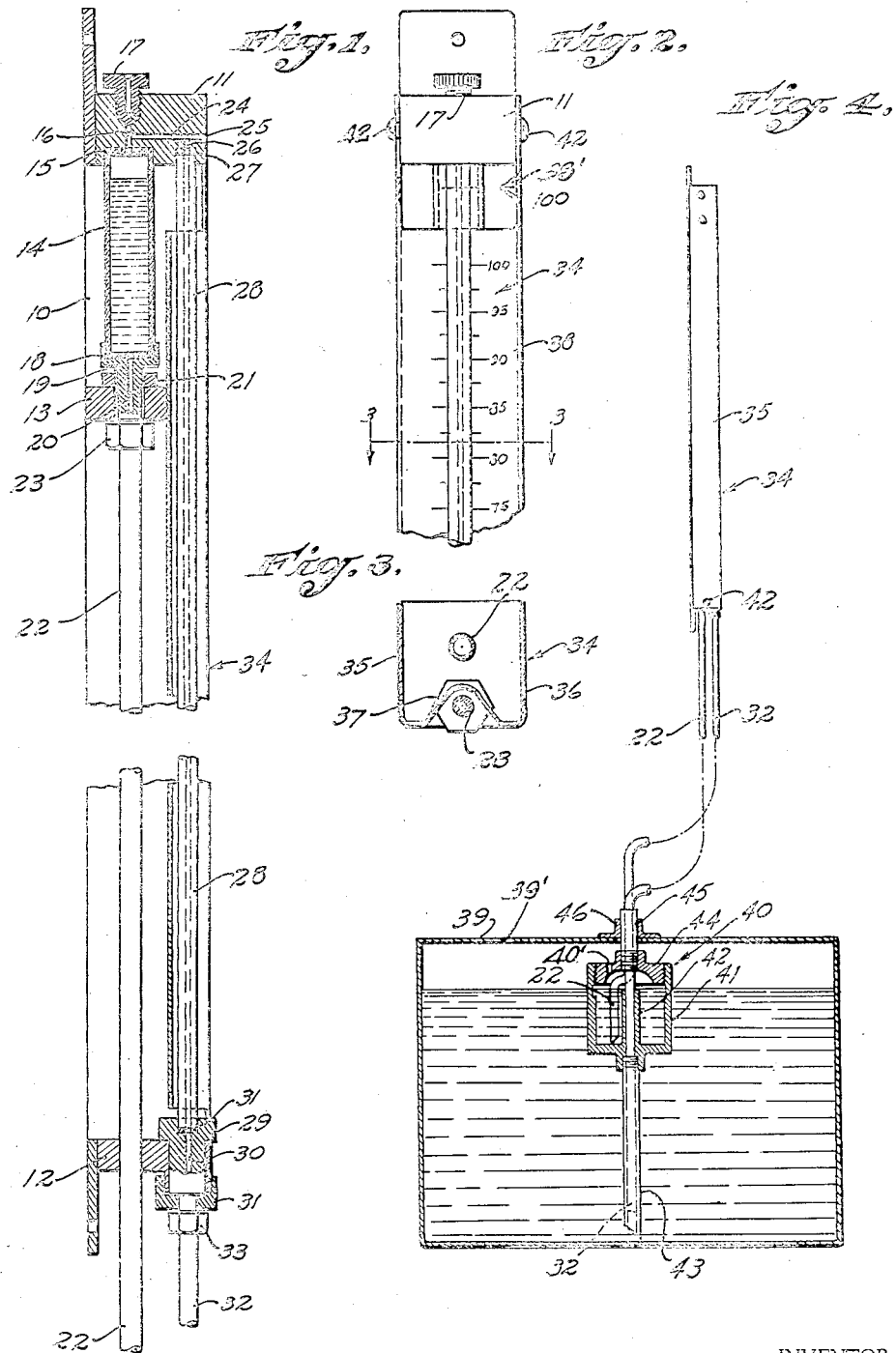
INVENTOR.
William A. Oates,
BY
Robert W. Fulwider
ATTORNEY.

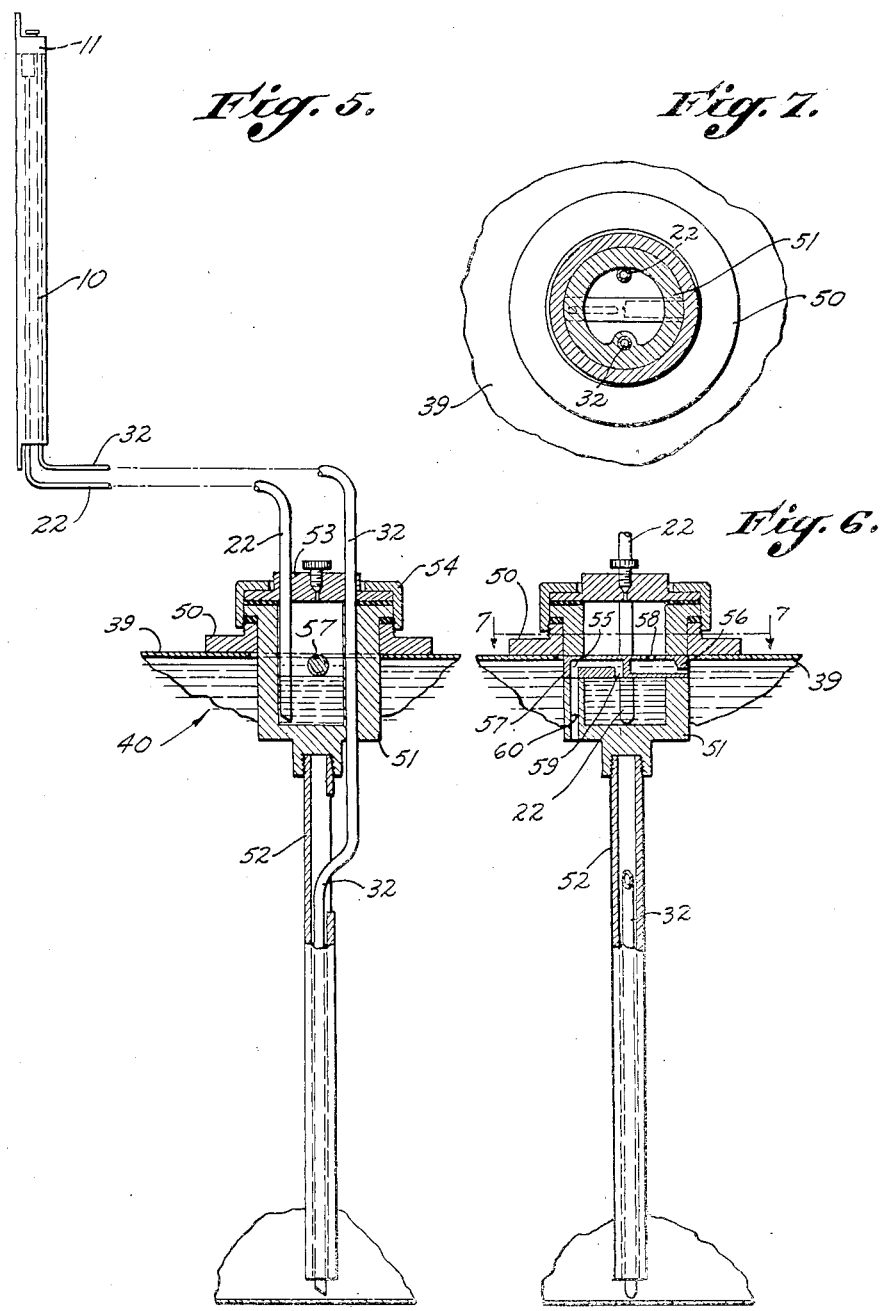

Patented Feb. 14, 1939

2,147,365

UNITED STATES PATENT OFFICE 2,147,365

LIQUID GAUGE

William A. Oates, Los Angeles, Calif.

Application December 7, 1936, Serial No. 114,579

1 Claim. (Cl. 73—299)

My invention relates generally to liquid gauges and more particularly to what may be termed tank gauges.

It is a major object of my invention to provide a tank gauge that can be used in both stationary and mobile tanks with equal accuracy, efficiency and economy and which because it has no moving parts is both economical and durable.

While there are of course numberless types of tanks that need gauges I call particular attention to fuel tanks used by automobiles and airplanes as being representative of the problems encountered in gauging mobile tanks, and to gasoline and oil storage tanks maintained in service stations and other refueling depots for automobiles, airplanes and similar conveyances as representative of the type of stationary tanks commonly used in various industries.

Heretofore it has been common practice to employ mechanical and/or electrical gauges in the gas tanks of motor and air vehicles which means that there must be of necessity continuous inspection, adjustment and repair, whereas once a gauge made according to my invention has been properly installed in such a tank, its owner's worries are over except for a very occasional cleaning.

In the stationary tank field as represented by gasoline service stations the practice has generally been to dispense with any gauge as being an unjustified expenditure of money, and the greater portion of the service stations today are still measuring the contents of their gasoline storage tanks with calibrated sticks. Because of the simplicity and low manufacturing cost of the gauge of my invention it can be made and installed in stationary tanks at a price within the reach of everyone and once installed it gives a continuous and accurate indication of the amount of liquid in the tank at all times.

Generally speaking the gauge of my invention comprises an inverted U tube construction wherein a balance is maintained between two columns of liquid separated by a gaseous fluid such as air or other gas relatively inert as to the liquids in the tubes, the reading point of the gauge being the plane of contact between one of the liquid columns and the intermediate gaseous fluid space. The gauge scale may be placed at any convenient point remote from the tank and in such manner that it is visible at all times. In a service station this would usually be in the office, while in an automobile or airplane it would usually be in the driver's compartment.

With the above and other objects in view which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawings illustrate two complete examples of the physical embodiment of the invention constructed in accordance with the best modes so far devised for the practical application of the principles thereof, and in which:

Fig. 1 is a vertical section of the gauge proper.

Fig. 2 is a front elevation of the upper portion of the gauge showing the reading scale.

Fig. 3 is a horizontal section taken at 3—3 of Fig. 2.

Fig. 4 is a vertical section of one form of tank assembly with the gauge installed.

Fig. 5 is a side elevation partly in section showing a modified form of reservoir tank construction.

Fig. 6 is a front elevation partly in section of the tank of Fig. 5.

Fig. 7 is a horizontal section taken at 7—7 in Fig. 6.

Referring now to the drawings which illustrate a preferred form of my device, and particularly to Fig. 1 thereof the numeral 10 indicates an upright supporting strip or plate provided with upper and lower brackets 11 and 12 respectively and an intermediate bracket 13, all of which project laterally from the plate 10 and preferably perpendicular thereto. These brackets may be cast as a part of the supporting strip 10, or may be in the form of blocks secured thereto or to a longitudinal supporting means such as the trough 34 hereinafter described.

A tube 14, preferably of glass, is supported between upper bracket 11 and intermediate bracket 13, the bracket 11 being provided with a slightly recessed portion on its under side in which a gasket 15 is placed before the upper end of tube 14 is inserted therein. A vertical passageway 16 is provided in the bracket 11 and extends from the recess holding the tube 14 up through the bracket and is provided with an enlarged threaded end at the top of the bracket in which a plug or needle valve stem 17 may be screwed. The lower end of the tube 14 rests upon a gasket 18 set in the flanged end of a nipple 19 which has its lower portion reduced in diameter and the upper part thereof externally threaded. The nipple 19 is provided with a relatively small vertical duct or passageway 20 extending therethrough, and may be screwed into a nut 21 which rests upon the upper face of bracket 13 and is concentric with a vertical hole therein, so that the lower end of the nipple 19 will extend down through the bracket hole as shown best in Fig. 1. In assembling the tube 14 it is placed in position as just described and the nut 21 is rotated to force the nipple 19 upwardly to cinch the tube 14 between its respective gaskets 15 and 18 to form a fluid tight connection.

An elongated relatively small diameter tube 22, preferably of metal such as copper or the like, is connected to the lower end of nipple 19 by any suitable means such as union 23, and extends downwardly through a suitable hole in lower bracket 12. The function of the tube 22 will be discussed later in connection with the operation of the apparatus as a whole.

Referring again to upper bracket 11 and particularly to Fig. 1 it will be seen that the bracket is provided with a horizontal duct or passage 24 which connects with passage 16 leading to the upper end of tube 14. As a practical means of forming this duct 24 the bracket 11 is drilled from the outside face and the end of the duct then plugged up as at 25. A vertical passage 26 may then be drilled from the bottom of the bracket 11 to intersect the horizontal duct 24, and the lower end of it is enlarged or recessed to accommodate a gasket 27 and the upper end of a vertically disposed tube 28 (preferably of glass) which extends downwardly parallel to tubes 14 and 22 to the lower bracket 12.

The lower bracket 12 is provided in its outer portion with a vertical hole or aperture in which a nipple 29 is housed. The nipple 29 is provided with a vertical passage 30 terminating in an enlarged recess on the upper face of the nipple of a size adapted to receive a gasket 31 and the lower end of tube 28 thereon. Any convenient means for adjusting the vertical position of the nipple 29 may be employed, but I have found that a very simple and efficient assembly is made if the bracket 12 is provided with a depending portion surrounding the nipple, which portion is externally threaded to receive a recessed nut 31, the upper face of which bears against the nipple 29 and forces it upward when the nut is screwed up on the depending portion of the bracket. By this procedure the tube 28 is forced upwardly to make a fluid tight connection at its upper and lower ends with gaskets 27 and 31 respectively. If desired a nipple construction similar to nipple 20 may be employed in lieu of the nipple 29. A tube 32 is preferably connected to the lower end of nipple 29 by any convenient means such as union 33, although tube 28 may be carried on down below bracket 12 if desired.

Since one of the features of my gauge resides in the fact that the height of the liquid in the tube 28 varies directly with the height of the liquid in the tank being measured, it becomes necessary to have a relatively long tube if a deep tank is being gauged and since I prefer to make the tube 28 of a relatively small internal diameter such as between $\frac{1}{32}''$ and $\frac{1}{16}''$, the problem of satisfactorily holding it in place against lateral strains at once appears. This can of course be solved in a number of ways, but most of them are either cumbersome and unsightly or unduly expensive. However, I have discovered a simple solution of this problem by the employment of a shallow M shaped vertically disposed member which I will for descriptive purposes term the trough 34. As seen best from Fig. 3 the trough 34 may be composed of one piece of relatively thin sheet metal fabricated with substantially parallel side portions 35 and 36 joined by a depressed central section 37, which provides a backing plate partially surrounding the tube 28. This trough 34 may be secured to the supporting plate 10 between brackets 11 and 12 by any convenient means not shown, or if the brackets 11, 12 and 13 are constructed as separate blocks they can all be secured between the portions 35 and 36 as by screws 42 to make a complete assembly which is then fastened to the plate 10 by any suitable means.

A scale 38 properly calibrated to correspond to the depth of a tank 39 being measured is placed adjacent to tube 28 in such a position as to be readily visible and to at all times indicate the liquid level in tube 28. The liquid in this tube is preferably provided with coloring matter if it is naturally water clear, such for instance as untreated gasoline, so that the liquid level will be more readily visible for reading on the scale. The scale 38 may be made adjustable vertically to compensate for differential level changes if they are appreciable. One manner of providing for this adjustment is by having the holes in the flanges of the trough through which the screws 42 pass elongated vertically, as shown in Figure 2.

Referring now to Fig. 4 it will be seen that the tank 39 which is vented to the atmosphere as at 39' is provided with a small reservoir tank 40 open to the interior of tank 39 and consequently to the atmosphere through a vent opening 40' and preferably supported in the upper portion of tank 39. This tank is preferably filled with the same fluid as contained in tank 39 although this is not essential. The tube 22 connected to tube 14 leads into the reservoir 40, and terminates at or near the bottom thereof and the tube 32 connected to indicating tube 28 leads into tank 39 and terminates at or near the bottom of that tank so that the reservoir 40 is at all times fluid connected to tube 14 and the main tank 39 is always fluid connected to indicating tube 28. To eliminate differential variations in the fluid of the two tubes by reason of temperature variations or movement thereof the tubes 22 and 32 should at all times be close together and preferably in parallel relationship, although this last limitation is not essential so long as their average or mean paths are substantially adjacent at all points, so that whatever variable factor affects one tube and its contents, will also affect the other tube and its contents in like manner and amount.

One very efficient type of reservoir especially suitable for stationary tanks is shown in Fig. 4. The reservoir 40 in this instance consists of a cylindrical casting 41 with an upstanding axial tube or sleeve 42 in the bottom. A depending tube or sleeve 43 is connected to the bottom of the casting 41 and extends down to a point adjacent the bottom of the tank 39. The top of the reservoir is formed by a plug 44 which is preferably screwed into the upper end of the casting 41, the plug 44 being provided with a hole through which the tubes 22 and 32 are led into the reservoir. The reservoir 40 can be mounted in the tank 39 by any convenient means such as the nipple 45 screwed into the threaded boss 46. As will be seen in the drawings, tube 22 terminates in the liquid contained in the reservoir so that atmospheric pressure is applied on its contents and tube 32 extends down in the protective sleeve 43 to be immersed in the liquid of the tank 39 so that the hydrostatic pressure of the tank contents is applied on the contents of this tube to balance the effect of the atmospheric pressure in the other tube.

In preparing my apparatus for operation, I preferably fill both tanks and then by means of a vacuum hose applied to the head of the plug or needle valve stem 17 draw the liquid up into both legs of the U-tube to the desired height, or the entire inverted U-tube may be filled with the liquid to be measured, although as mentioned a different liquid may be used in reservoir 40 and tubes 28 and 32. Before the vacuum hose is detached, the valve 17 is closed, and if the entire U-tube was filled it is reopened to allow enough air into the tubes to cause the level of the liquid columns to drop down a short distance below the top of the tubes, at which point the needle valve stem 17 is closed and the system is in balance with the columns at substantially equal heights depending on the relative heights of the liquid surfaces of the tanks 39 and 40. The scale 38 is provided with a reference point or line provided by an inwardly directed finger 38' carried by one flange of the trough, as clearly shown in Figure 2. This reference point or line is at all times set opposite the liquid level in tube 14. Once the level of tube 14 has been established it varies but little because the level in tank 40 remains substantially unchanged, and because the cross-section of tube 14 is made considerably larger than that of tube 28 as for example 100 times larger, so that large variations in liquid level in tube 28 only cause small variations in tube 14. The scale 38 is calibrated to read directly the number of gallons in the tank 39 corresponding to the depth of the liquid in said tank, said calibrations being coordinated with the reference point on the scale so that as long as the reference point is opposite the liquid level of tube 14 the correct gallonage of tank 39 may be read directly by the position of the liquid level of tube 28 with respect to the scale 38. The larger the cross-section of tube 14 relative to tube 28 the smaller the rise in liquid in tube 14 for a given lowering of liquid in tube 28, and if this ratio is large the scale 38 need not be adjusted except when the liquid in tank 39 gets well down, at which time the scale should be raised a little to keep the reference point opposite the liquid level in tube 14 to insure absolute accuracy. By this system of maintaining a reference liquid surface at a substantially constant pressure the liquid level of tube 28 will at all times vary directly with variations in the level in tank 39. If desired the scale may be calibrated empirically to take care of change in level of the reference liquid so that the scale need not be varied once it is set with respect to the reference liquid level.

Referring to Figs. 5, 6 and 7 there is illustrated a modified form of reservoir 40 particularly adapted for mobile tanks especially airplane tanks where the tank is sometimes turned over. The tank to be gauged is again indicated by the numeral 39 and is provided with an opening around which a collar 50 is secured as by welding or the like. A casting 51 preferably cylindrical in shape and provided with a flange around its upper rim is supported in the collar 50 by its flanged portion. The wall of casting 51 may be drilled to provide a vertical passage through which tube 32 may be led, and a tube or sleeve 52 is fastened to the bottom of casting 50 by any convenient means such as threading. The sleeve 52 has a slot cut in its upper portion to permit the entry of tube 32 which extends downwardly in the sleeve and is protected thereby. The top of reservoir 40 in this case may be formed as a cap 53 adapted to be held in place by a collar 54 which screws on to collar 50, suitable gaskets being provided at the joint to insure fluid tight connections.

A horizontal tube 55 is provided in the reservoir 40 at the height slightly above that of the desired liquid level therein, which tube is solid at its midpoint and provides two horizontal ducts 56 and 57, the duct 56 usually being larger than duct 57 but having a restricted opening as shown in Fig. 6. Duct 56 has an opening 58 in its upper face adjoining its inner end, and duct 57 has an opening 59 on its lower face at its inner end. It will be understood that these ducts may be formed of separate tubes, but I prefer as a simple means of forming them to drill a rod from each end toward the center, leaving a core at the middle and then to sweat the drilled tube into oppositely positioned holes in the casting walls. A vertical passage or duct 60 is provided in the casting wall at a point to connect with horizontal duct 57 to form a siphon tube. The reservoir is filled with the desired liquid preferably the same as that in tank 39, up to the level of opening 59, it being evident that if filled above tube 55 the liquid will siphon out through duct 57. The duct 56 with its upwardly facing aperture 58 provides a vent to the tank 39 so that the pressure on each liquid surface will be the same, the tank 39 being vented to the atmosphere in any suitable manner.

The proportions of the casting and the position of the ducts is such that as the reservoir is rotated as it would be in an airplane doing a loop or barrel role, that the liquid will normally be displaced in such a manner as not to have any spill out of the ducts. When the tanks are upside down some liquid from the tank 39 will of course flow into the reservoir through duct 56 and possibly duct 57, but when the reservoir is righted, excess liquid will siphon out through duct 57. When the gauge is inverted the liquid in the tubes compresses the air between the columns but ordinarily does not force it out. In either case however, no harm is done for as soon as the gauge is righted the liquid in the two tubes resumes its former position, and if any discrepancy appears the scale is reset so that its reference is again level with the top of the liquid in tube 14. The results of many tests indicate that no slugs of air form in the lower ends of the tubes but if they do, they can be easily eliminated by opening the plug 17 a little and allowing the liquid columns to drop a short distance to force out any air bubbles that may have entered the ends of the tubes when they were inverted.

It will be noted in the drawings that I have arranged the tubes so that the ends are the same distance apart horizontally as the tubes in the upper portion of the gauge. I find that this is highly desirable in mobile tanks for the effects of movement are the same on each column of liquid and no error is created by such movement.

From the foregoing description of the preferred forms of my invention it will be apparent that my liquid gauge is extremely simple in both construction and operation and avoids the many dfficulties experienced in the production and use of known gauges. By having the air cushion between the columns of liquid, a clear and definite reading point or plane is always available and there is no danger of contaminating the liquids used in gauges. Furthermore, a wide reading range is provided and the scale is equally suitable for use with any and all liquids, no change in the scale being necessary. Likewise, the gauge of my invention gives a high degree of accuracy because the reading level varies directly with the level of the fluid being gauged.

I claim as my invention:

A gauge for indicating the quantity of liquid in a tank vented to the atmosphere comprising: an upright supporting frame having fixed top and bottom walls spaced apart the distance the liquid level in the tank fluctuates; a glass tube spanning the space between the top and bottom walls with its ends anchored thereto, said tube having a small diameter bore; another tube having a large diameter bore depending from the top wall in back of the first designated tube but for only part of the distance between the top and bottom walls; the top wall having a passageway therein connecting the upper ends of the tubes; a front wall for the supporting frame having a longitudinal fold which embraces the rear and sides of the first designated tube; a scale delineated on the front wall to cooperate with the level of liquid in said first designated tube to indicate the level of the liquid in the tank; a conduit connecting the bottom of said first designated tube with the bottom of the tank; liquid in said conduit and the first designated tube rising to a height dependent upon the depth of the liquid in the tank; a small reservoir for liquid at the top of the tank open to the atmosphere; a conduit connecting the bottom of the second mentioned tube with the reservoir; and liquid in the reservoir, said last named conduit, and the second mentioned tube.

WILLIAM A. OATES.